A. AICHELE.
ELECTRODE OF METALLIC VAPOR RECTIFIERS OR OTHER APPARATUS.
APPLICATION FILED JAN. 19, 1914.
1,221,647.                                    Patented Apr. 3, 1917.
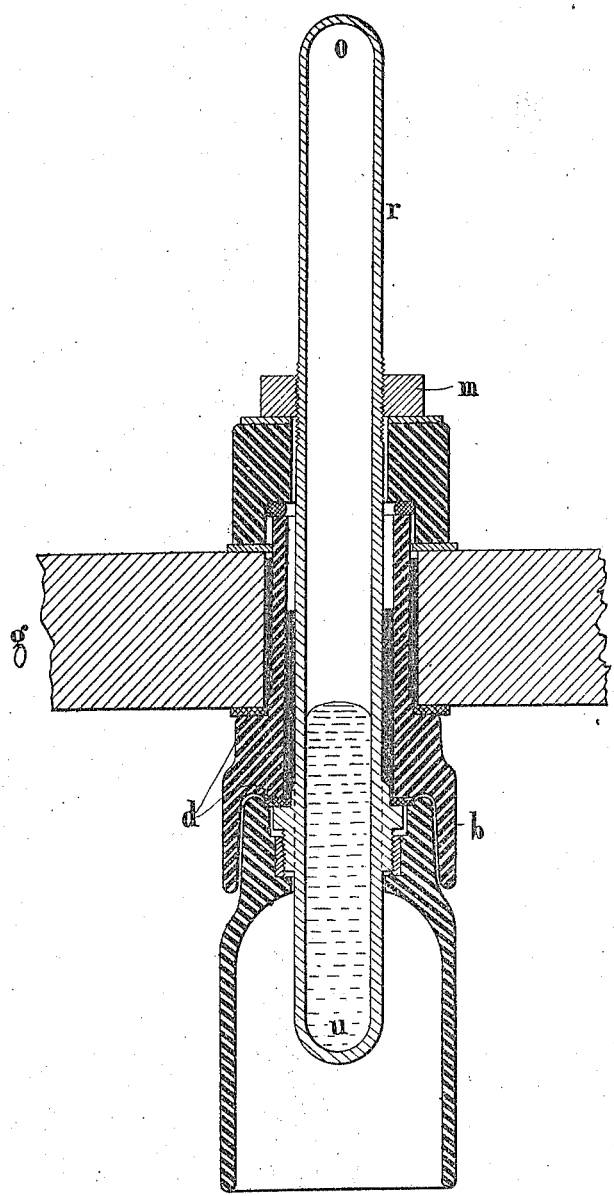
WITNESSES:
                                    INVENTOR:
                                    Albert Aichele
                                 BY
                                        ATTORNEYS.

UNITED STATES PATENT OFFICE.

ALBERT AICHELE, OF BADEN, SWITZERLAND, ASSIGNOR TO AKTIENGESELLSCHAFT BROWN BOVERI & CIE., OF BADEN, SWITZERLAND.

ELECTRODE OF METALLIC VAPOR-RECTIFIERS OR OTHER APPARATUS.

1,221,647.  Specification of Letters Patent.  Patented Apr. 3, 1917.

Application filed January 13, 1914. Serial No. 813,102.

*To all whom it may concern:*

Be it known that I, ALBERT AICHELE, a citizen of the Republic of Switzerland, residing at Baden, Switzerland, have invented certain new and useful Improvements in and Relating to the Electrodes of Metallic Vapor-Rectifiers or other Apparatus, of which the following is a specification.

This invention relates to the electrodes and chiefly the anodes of metal vapor rectifiers.

It is a well-known fact that an effective and sufficient cooling of the anodes is of the greatest importance for the operation and safety of metal vapor rectifiers. An undue increase in temperature of the anode results in a breakdown and a so-called "arcing" and consequently a destruction of the rectifier within a short period. In addition to complying with the requirement of an effective cooling, it is necessary to comply at the same time with the requirement of an efficient insulation of the anodes. As, however, the insulation materials are bad heat conductors, the removal of heat from the anode is rendered extremely difficult.

This invention has for its object an arrangement which renders possible to remove the heat from the anode in an effective manner without impairing the insulation.

The invention consists in providing a heat conducting connection between the anode and an evacuated hollow body, the portion of which adjacent to the hot part of the anode is filled with a liquid, whereas the other portion is in contact with the surrounding air or like cooling agent.

The invention also consists in an electrode formed of a closed evacuated tube partly filled with liquid and projecting from the rectifier vessel.

The accompanying diagrammatic drawing illustrates one manner of carrying the present invention into effect.

In this drawing the electrode takes the form of a completely closed metallic hollow tube $r$ with a part which projects from the rectifier $g$. The tube $r$ is sealed, evacuated and partly filled with a liquid which serves as cooling agent for the part $u$ of the electrode within the vessel $g$. Owing to this part of the electrode becoming heated, the liquid evaporates, the resulting vapor fills the tube and is condensed again on its upper part $o$, from which the liquid flows back into the lower hot part $u$.

From a thermal point of view, therefore, a complete cycle takes place continuously.

The outer part $o$ of the tube may be surrounded by air or another cooling agent.

The tube $r$ as shown is provided with a collar $b$ which may be welded or connected thereto in any other gas tight manner and which renders it possible to cause the packing surfaces $d$ to exert a pressure away from the vessel $g$. This pressure is, for instance, exerted by a nut $m$ by means of which the electrode together with its insulation $i$ and packing may be secured or detached. Any suitable gas tight connection may be employed.

It will be understood that the form of the invention described is given as an example and may be modified. For instance, the electrode may have a body such as a tube mounted thereon or inserted therein and the surface of the part of the tube which is surrounded by the cooling agent may be enlarged by cooling ribs or similar means. In either case the action is the same and an extremely rapid and effective transmission of heat from the electrode to the cooling agent is rendered possible.

Having now described my invention, what I claim as new and desire to secure by Letters Patent is:—

1. A metal vapor rectifier including a metal wall, an anode projecting on both sides of said wall but insulated therefrom, and comprising a single metal tube sealed at both ends and containing mercury under diminished pressure.

2. A metal vapor rectifier including a metal wall, an anode projecting on both sides of said wall but insulated therefrom, said anode comprising a single metal tube sealed at both ends, mercury in said tube under diminished pressure, a part of said tube adapted to condense mercury vapor and return the condensed vapor to the liquid mercury.

In testimony whereof, I affix my signature in presence of two witnesses.

ALBERT AICHELE.

Witnesses:
 CARL GUBECK,
 FRANK BOHR.